P. BEAUSHENE.
LAWN MOWER.
APPLICATION FILED DEC. 29, 1917.

1,278,569.

Patented Sept. 10, 1918.
2 SHEETS—SHEET 1.

Witnesses

Inventor
P. Beaushene,
By Victor J. Evans
Attorney

P. BEAUSHENE.
LAWN MOWER.
APPLICATION FILED DEC. 29, 1917.

1,278,569.

Patented Sept. 10, 1918.
2 SHEETS—SHEET 2.

Witnesses

Inventor
P. Beaushene,
By Victor J. Evans
Attorney

UNITED STATES PATENT OFFICE.

PETER BEAUSHENE, OF RENTON, WASHINGTON.

LAWN-MOWER.

1,278,569.   Specification of Letters Patent.   Patented Sept. 10, 1918.

Application filed December 29, 1917. Serial No. 209,533.

*To all whom it may concern:*

Be it known that I, PETER BEAUSHENE, a citizen of the Dominion of Canada, residing at Renton, in the county of King and State of Washington, have invented new and useful Improvements in Lawn-Mowers, of which the following is a specification.

This invention relates to lawn mowers, and has for one of its objects the provision of a machine of this character which is simple in construction, to operate with the desired smoothness and efficiency, being provided with means for raking and collecting the grass or other material subsequent to being cut.

The invention embodies an apron attachment upon which the grass or other material is raked subsequent to being cut, the apron being detachably associated with the machine to permit use of the latter with or without the apron as desired.

The nature and advantages of the invention will be better understood when the following detail description is read in connection with the accompanying drawings, the invention residing in the construction, combination and arrangement of parts as claimed.

In the drawings forming part of this specification like numerals of reference indicate similar parts in the several views and wherein:—

Figure 1:
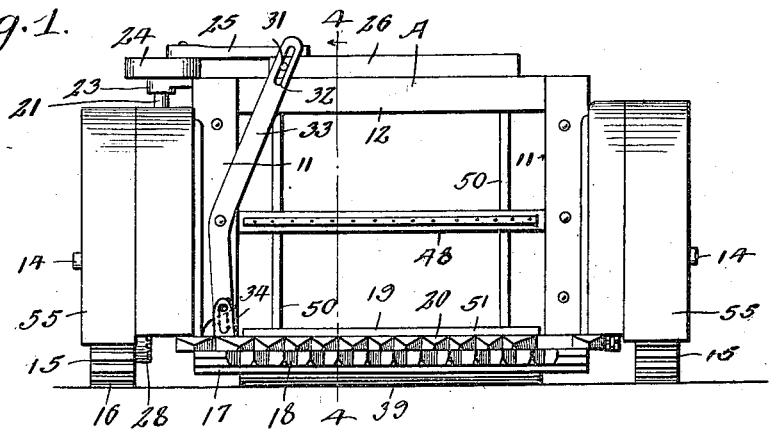
Figure 1 is a front elevation of the machine constructed in accordance with my invention.
Figure 2:
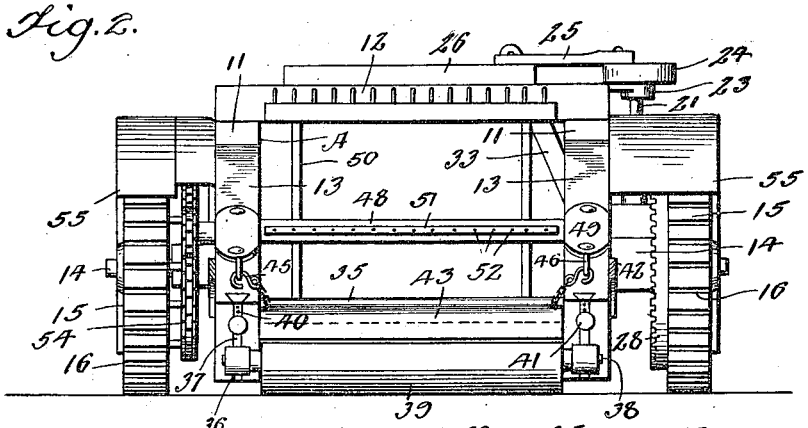
Fig. 2 is a rear elevation.
Figure 5:
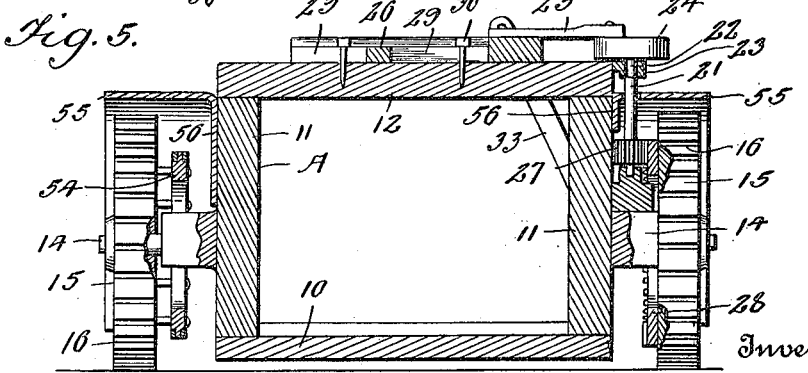
Fig. 5 is a sectional view taken on line 5—5 of Fig. 4.
Figure 3:
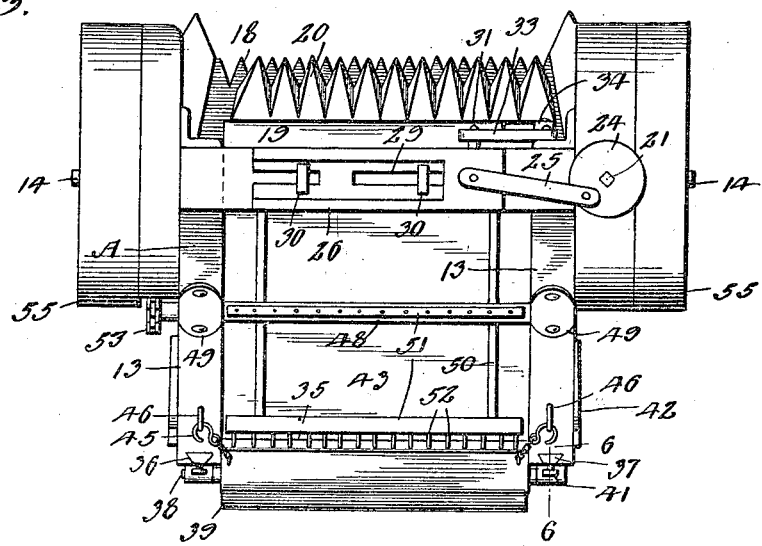
Fig. 3 is a top plan view.
Figure 4:
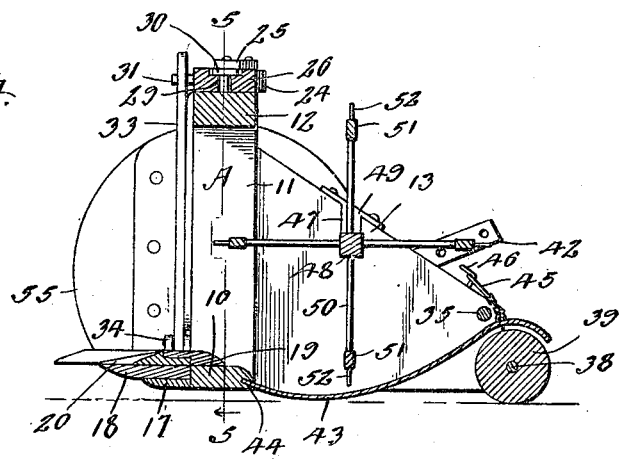
Fig. 4 is a sectional view taken on line 4—4 of Fig. 1.
Figure 6:
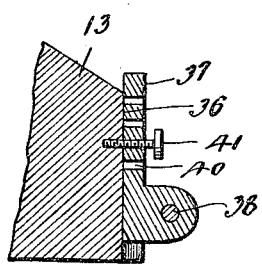
Fig. 6 is a section taken on line 6—6 of Fig. 1.

Referring to the drawings in detail A indicates generally the body or frame of the machine, which embodies a base 10 from which rises at the opposite extremities thereof parallel standards 11 which are connected at their upper ends by a cross piece 12. The frame further embodies a pair of spaced substantially triangular shaped side pieces 13 which are secured to the standards 11 and projecting rearwardly therefrom. Projecting laterally from the standards 11 are stub shafts 14 upon which are journaled the traction wheels 15, the latter being preferably provided with a roughened peripheral surface 16. A plate 17 is secured in any suitable manner to the base 10 and forms a continuation of the latter, the plate providing a support for the fixed blade 18. Suitably secured to the base 10 is a second plate 19 overlying the fixed blade 18, and interposed between the latter and the projecting edge of the plate 19 is a movable cutting blade 20 arranged to reciprocate relative to the fixed blade. The blades 18 and 20 respectively are of usual construction.

For the purpose of imparting reciprocatory movement to the blade 20, I employ a vertically disposed shaft 21, arranged adjacent and in parallelism with one of the standards 11, the said shaft having one extremity journaled in the upper part of the adjacent shaft 14, while the opposite extremity of the shaft is reduced as at 22 and journaled in an apertured lug 23 projecting laterally from the cross piece 12 of the frame. Fixed to the reduced extremity of the shaft 21 is a disk 24 to the upper surface of which one end of a link 25 is eccentrically connected, the opposite extremity of said link being suitably secured to a slide 26 reposing upon the cross piece 12 of the frame. Fixed to the shaft 21 is a cog wheel 27 which meshes with a ring gear 28 carried by one of the wheels 15, and manifestly as the wheels 15 are rotated over the ground, the shaft 21 is also rotated with a resultant reciprocatory movement imparted to a slide 26. The slide 26 is provided with spaced longitudinally disposed slots 29 which receive headed fastening elements 30 which serve to maintain the slide operatively positioned upon the cross piece 12 of the frame. Projecting forwardly from one of the longitudinal edges of the slide is a pin 31 which is received within an elongated slot 32 of a rock arm 33, the latter being fulcrumed upon one of the standards 11. The lowermost extremity of the arm 33 is arranged between spaced lugs 34 rising from the movable cutting blade 20 at one end thereof. The lower extremity of the arm is also slotted as shown, to receive the pin carried by the lug 34 which serves to hold the parts operatively associated. Obviously as the slide 26 is moved across the frame A, rocking movement is imparted to the arm 33 which in turn reciprocates the cutting blade 20 in the usual manner.

The side pieces 13 of the frame are connected by a transverse rod 35 which is used to prevent spreading of the side pieces and to increase the strength of the machine generally. The rear edge of each side piece is provided with a vertically disposed dovetail groove 36, and these grooves are adapted to receive the posts 37 of similar cross sectional configuration rising from the opposite extremities of a shaft 38 upon which is loosely mounted a ground roller 39. The posts 37 are provided with a series of openings 40 one of which is adapted to register with an opening in the rear wall of the grooves 36, for the reception of a set screw or other suitable fastening element 41 which holds the posts fixed relatively to the side members 13. This construction obviously provides for an adjustment of the ground roller 39 in a vertical direction so as to vary the distance between the cutting blades and the surface of the ground as will be readily understood. Suitably secured to the side members 13 of the frame are relatively short handles 42 to which auxiliary handles of any desired length (not shown) may be attached.

The machine is primarily intended for cutting grass, although its use is not limited in this capacity. With a view of collecting the grass or other material subsequent to being cut, I provide an apron 43 which is disposed between the side pieces 13 and unitedly defines therewith a compartment for the reception of the cuttings. It is my purpose to provide a detachable connection between the apron 43 and the frame of the machine, to permit the latter to be used with or without the apron as desired. With this end in view I provide the rear edge of the base 10 with a longitudinally extending groove 44 which receives one end of the apron 43. As shown the apron 43 is curved longitudinally in an upward direction whereby the rear end of the apron is positioned between the transverse rod 35 and the ground roller 39. Swingingly associated with this end of the apron are hook-like elements 45 which are adapted to engage the stationary hooks 46 secured to the upper edge of the side pieces 13. The hooks 45 coöperate with the hooks 46 to maintain the apron fixed in its proper position upon the machine when its use is desired, it being only necessary to disengage the hooks 45 from the hooks 46 to remove the apron from the machine, which can be conveniently done by simply removing the apron from the groove 44.

The side pieces 13 are provided with alined recesses 47 constituting bearings for the opposite ends of a shaft 48 forming part of a rake. Plates 49 are suitably secured to the side pieces 13 covering the recesses 47 to prevent accidental separation of the shaft 48 from its bearings or derangement thereof. The plates may be readily separated from the side pieces when it is desired to remove the rake for any purpose whatsoever. Radiating from the shaft 49 are a plurality of arms 50, the arms being arranged in spaced pairs, and secured to each pair is a transverse strip 51 from one edge of which project a series of fingers 52. These associated parts define a rake which when the machine is operated serves to rake the cuttings upon the apron 43 as will be readily apparent. One end of the shaft 48 projects beyond the adjacent side member 13 and has secured thereto a small cog wheel 53 over which, and a relatively large cog wheel 54 secured to the ground wheel 15, is trained an endless chain, whereby rotary motion is imparted to the shaft 48 as the ground wheels 15 are moved over the surface, thus operating the rake with the travel of the machine. The machine in addition to being positive in operation is light and durable. The ground wheels 15 together with their associated parts are protected from injury by coming in contact with obstacles, by metallic guards 55 partly encircling the wheels 15, the guards being provided with flanges 56 which are secured to the standards 11.

While it is believed that from the foregoing description the nature and advantages of the invention will be readily apparent, I desire to have it understood that what is herein shown and described is merely illustrative of the preferred embodiment of the invention, to which I do not limit myself, and that such changes may be resorted to when desired as fall within the scope of what is claimed.

What is claimed is:—

1. In a lawn mower, a frame including a base, top and side members, wheels journaled on said frame, a fixed blade, a reciprocating cutting blade movable relative to the fixed blade, a rock arm fulcrumed upon the frame and having one end connected to said movable blade, a slide mounted on the frame and having connection with the opposite end of said arm, and means for imparting motion to said slide from one of said wheels whereby to reciprocate said movable blade.

2. In a lawn mower, a frame including a base, top and side members, stub shafts projecting laterally from said side members, wheels journaled on said shafts, fixed blade, a reciprocating cutting blade movable relative to the fixed blade, a slide reposing upon said top, a bearing projecting laterally from said top, a vertically disposed shaft journaled in said bearing and the upper portion of one of said shafts, a ring gear on one wheel, a cog carried by the vertical shaft and meshing with said gear whereby the vertical shaft is rotated by rotational movement of said wheel, a link eccentrically connected to said shaft and with said slide to manipulate the latter, and a rock arm fulcrumed upon the frame and having one extremity connected with the slide and its opposite end connected with the movable blade to reciprocate the latter.

3. In a lawn mower, a frame, wheels journaled upon the frame, a fixed blade, a reciprocating cutting blade movable relative to the fixed blade, means driven from one of said wheels and having connection with the movable blade to reciprocate the latter, a ground roller adjustably associated with the frame, an apron having one end detachably connected with the frame immediately at the rear of said blade, the opposite end of said apron being disposed above the roller, and means carried by said apron and coöperating with means on the frame for detachably supporting the rear end of the apron upon the frame, and a rake journaled upon the frame above said apron.

4. In a lawn mover, a frame including a base, top and side members, a fixed blade, a reciprocating blade movable relative to the fixed blade, a connection between one of said wheels and the reciprocating blade to reciprocate the latter as the machine moves over the ground, a surface engaging roller adjustably associated with said side members, said base having a longitudinal groove, an apron having one extremity fitted in the groove, hooks carried by the side members, hook-like elements carried by the opposite extremity of the apron and engaging the hooks on said frame to hold the apron fixed thereon, and a rake journaled between the side members above the apron, and operable with the movement of the machine over the surface.

5. In a lawn mower, a frame including a base, side and end members, wheels journaled on said frame, a fixed blade, a reciprocating blade movable relative to the fixed blade, a connection between one of said wheels and the reciprocating blade whereby the latter is reciprocated when the machine moves over the surface, an apron detachably associated with the frame, a rake including a shaft journaled between the side members and having one extremity projecting beyond the adjacent side member, a small gear on said shaft, a large gear on the adjacent ground wheel, and an endless chain trained over said gears whereby the rake is operated as the machine is moved over the surface.

In testimony whereof I affix my signature.

PETER BEAUSHENE.

Witnesses:
ETHEL M. ST. PETER,
CHAS. A. ST. PETER.

Copies of this patent may be obtained for five cents each, by addressing the "Commissioner of Patents, Washington, D. C."